(12) United States Patent
Majd et al.

(10) Patent No.: US 8,731,162 B1
(45) Date of Patent: May 20, 2014

(54) SYSTEMS AND METHODS FOR MATCHING CALL DETAIL RECORDS FOR THE SAME COMMUNICATION GENERATED BY DIFFERENT ELEMENTS OF AN IP TELEPHONY SYSTEM

(71) Applicant: Vonage Network, LLC, Holmdel, NJ (US)

(72) Inventors: Casem Majd, Holmdel, NJ (US); Rohan Dwarkha, Mendham, NJ (US); Andrew Bucko, Old Bridge, NJ (US); Jason Farkas, Belle Meade, NJ (US); Matthew Sullivan, Brown Mills, NJ (US); Graham McGonigal, Roswell, GA (US)

(73) Assignee: Vonage Network, LLC, Homdel, NJ (US)

( * ) Notice: Subject to any disclaimer, the term of this patent is extended or adjusted under 35 U.S.C. 154(b) by 0 days.

(21) Appl. No.: 13/837,603

(22) Filed: Mar. 15, 2013

(51) Int. Cl.
*H04M 15/00* (2006.01)
*H04M 3/42* (2006.01)

(52) U.S. Cl.
USPC .................. 379/126; 379/121.05; 379/212.01

(58) Field of Classification Search
USPC .................. 379/111, 114.01, 115.01, 121.01, 379/121.05, 126, 133, 134, 212.01; 455/405, 406, 408; 370/352, 356, 357, 370/398, 395.21, 395.3, 401
See application file for complete search history.

(56) References Cited

U.S. PATENT DOCUMENTS

| | | | | |
|---|---|---|---|---|
| 6,104,704 A * | 8/2000 | Buhler et al. | ................. | 370/252 |
| 6,298,127 B1 * | 10/2001 | Petrunka | ...................... | 379/126 |
| 6,718,023 B1 * | 4/2004 | Zolotov | ....................... | 379/133 |
| 6,757,290 B1 * | 6/2004 | Kalmanek et al. | ............ | 370/401 |
| 7,245,610 B1 * | 7/2007 | Kalmanek et al. | ............ | 370/352 |
| 7,529,356 B2 * | 5/2009 | Cooke et al. | ................. | 379/126 |
| 7,640,015 B2 * | 12/2009 | Connelly et al. | ............. | 455/423 |
| 7,725,097 B2 * | 5/2010 | Koskinen et al. | ............. | 455/406 |
| 7,778,240 B1 * | 8/2010 | Kalmanek et al. | ............ | 370/352 |
| 7,805,126 B2 * | 9/2010 | Koskinen et al. | ............. | 455/406 |
| 8,249,059 B2 * | 8/2012 | Kalmanek et al. | ............ | 370/352 |
| 2004/0101117 A1* | 5/2004 | Koskinen et al. | ............. | 379/126 |
| 2004/0152443 A1* | 8/2004 | Koskinen et al. | ............. | 455/406 |
| 2004/0210524 A1* | 10/2004 | Benenati et al. | ................. | 705/40 |
| 2005/0030908 A1* | 2/2005 | Lehmann et al. | ............. | 370/265 |
| 2005/0190721 A1* | 9/2005 | Pershan | ....................... | 370/328 |
| 2006/0239427 A1* | 10/2006 | Cooke et al. | ............. | 379/114.01 |
| 2012/0252473 A1* | 10/2012 | Kalmanek et al. | ............ | 455/450 |

* cited by examiner

*Primary Examiner* — Binh Tieu
(74) *Attorney, Agent, or Firm* — Nixon & Vanderhye P.C.; Joseph Pagnotta

(57) ABSTRACT

Call detail records (CDRs) that are generated by different elements of an IP telephony system in connection with the same communication can be matched to one another using timing information contained in the CDRs. Other information in addition to timing information, and which is present in two CDRs relating to the same communication may be used in conjunction with timing information to match CDRs from the same communication.

23 Claims, 5 Drawing Sheets

SYSTEMS AND METHODS FOR MATCHING CALL DETAIL RECORDS FOR THE SAME COMMUNICATION GENERATED BY DIFFERENT ELEMENTS OF AN IP TELEPHONY SYSTEM

BACKGROUND OF THE INVENTION

The invention is related to Internet Protocol (IP) telephony systems. More specifically, the invention is related to telephony devices and methods of routing telephony communications via an IP telephony system When an IP telephony system receives an incoming communication, the communication can be routed through multiple elements of the IP telephony system before the call is either terminated to a customer telephony device, or passed off to another telephony system. In some instances, multiple ones of the elements which handle the incoming communication each generate a call detail record (CDR) containing various pieces of information about the communication. Each element that generates a CDR sends the CDR to a central CDR unit of the IP telephony system.

Also, a single element that is responsible for handing a communication can generate both a start CDR and a stop CDR for the communication. Thus, a single element may generate two CDRs for the communication, each of which include different items of information about the communication.

When multiple elements of an IP telephony system each generate a different CDR relating to the same communication, it is desirable for the CDR unit to match the different CDRs that are related to the same communication. Matching the various CDRs related to a single incoming communication is helpful in determining which elements of the IP telephony system were responsible for handling the communication, which can be helpful in troubleshooting when problems arise. Also, information collected from all of the CDRs can be useful in billing for the communication. Information contained in the various different CDRs also can be aggregated into a single final CDR for the communication, and the final CDR can be used for billing purposes, quality monitoring and assurance, and troubleshooting. For all these reasons, it is desirable to have systems and methods which can match multiple CDRs generated by different elements of the IP telephony system, but which all relate to the same communication.

In some instances, it is possible to link multiple different CDRs which have been created for the same telephony communication using call identification number information contained in the CDRs themselves. However, in some types of call flows, it is not possible to use the call identification number information in the CDRs to link all the CDRs that relate to a single communication.

In view of the foregoing, it is desirable to find an alternate method for linking a plurality of CDRs which have been generated by various elements of an IP telephony system, but which all relate to the same telephony communication.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
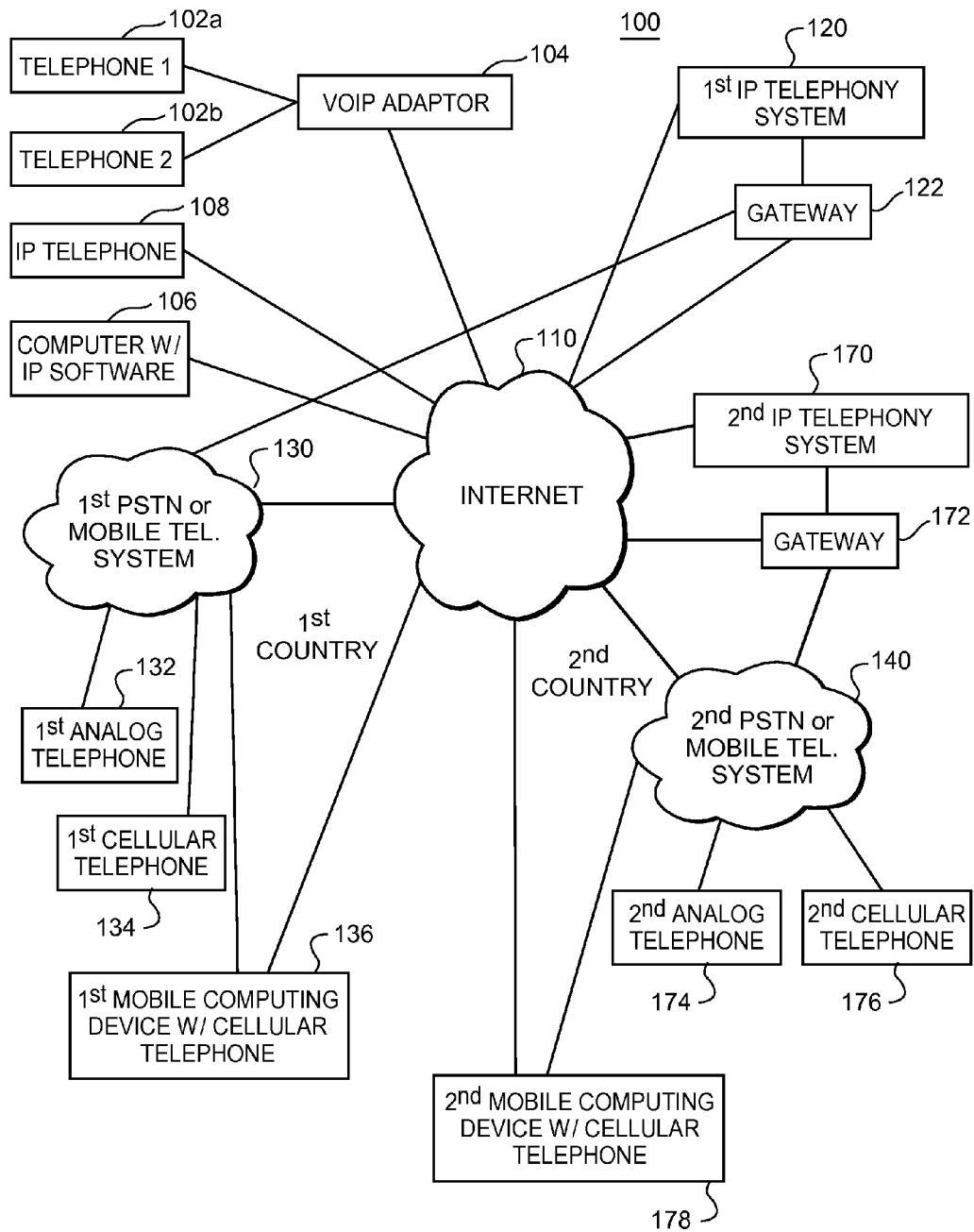
FIG. 1 is a diagram of a communications environment including various elements which are associated with an Internet protocol (IP) telephony system operating in accordance with one embodiment of the invention.

As illustrated in FIG. 1, a communications environment 100 is provided to facilitate IP based communications. A first IP telephony system 120 enables connection of telephone calls between its own customers and other parties via data communications that pass over a data network. The data network is commonly the Internet 110, however, private data networks may form all or a portion of the data communication path. The first IP telephony system 120 is connected to the Internet 110.

In addition, the first IP telephony system 120 is connected to a first publicly switched telephone network (PSTN) 130, a second PSTN 140, and a second IP telephony system 170. This allows the first IP telephony system 120 to receive telephony communications from and send telephony communications to each of these other communications systems. In some instances, the first IP telephony system 120 would receive an incoming communication directed to one of its own customers from one of these other communications system. The first IP telephony system 120 then terminates the call to the customer's telephony device. In other instances, the first IP telephony system may setup an outgoing call from one of its customers to a customer of one of these other communications systems. In still other instances, the first IP telephony system 120 may act as an intermediate party to connect a communication between two of these other communications systems.

In some instances, the first IP telephony system 120 accesses the Internet 110 via a gateway 122. The gateway 122 allows users and devices that are connected to the first and second PSTNs 130, 140 and/or the second IP telephony system 170 to connect with users and devices that are reachable through the first IP telephony system 120, and vice versa. In some instances, the gateway 122 would be a part of the first IP telephony system 120. In other instances, the gateway 122 could be maintained by a third party.

Customers of the first IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a cellular telephone system to access the Internet 110.

Alternatively, a customer could utilize an analog telephone 102a which is connected to the Internet 110 via a terminal adapter 104. The terminal adapter 104 converts analog signals from the telephone 102a into data signals that pass over the Internet 110, and vice versa. Also, as illustrated in FIG. 1, multiple analog telephones 102a and 102b could all be coupled to the same terminal adaptor 104. Analog telephone devices include, but are not limited to, standard telephones and document imaging devices such as facsimile machines. A configuration using a terminal adapter 104 is common where all of the analog telephones 102a, 102b are located in a residence or business, and all of the telephones are connected to the same terminal adapter. With this configuration, all of the analog telephones 102a, 102b share the same telephone number assigned to the terminal adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems. In some instances, the soft-phone client could be assigned its own telephone number. In other instances, the soft-phone client could be associated with a telephone number that is also assigned to an IP telephone 108, or to a terminal adaptor 104 that is connected to one or more analog telephones 102a, 102b.

A third party using the first analog telephone 132 which is connected to the first PSTN 130 may call a customer of the IP telephony system 120. In this instance, the call is initially connected from the first analog telephone 132 to the first PSTN 130, and then from the first PSTN 130, through the gateway 122 to the first IP telephony system 120. The first IP telephony system 120 then routes the call to the customer's IP telephony device. A third party using the first cellular telephone 134 could also place a call to an IP telephony system customer, and the connection would be established in a similar manner, although the first link would involve communications between the first cellular telephone 134 and a cellular telephone network. For purposes of this explanation, the cellular telephone network is considered part of the first PSTN 130.

In addition, mobile computing devices which include cellular telephony capabilities could also be used to place telephone calls to customers of the IP telephony system. A first mobile computing device 136, as illustrated in FIG. 1, might connect to the first PSTN 130 using its cellular telephone capabilities. However, such devices might also have the ability to connect wirelessly via some other means. For example, the mobile computing device 136 might communicate with a wireless data router to connect the first mobile computing device 136 directly to a data network, such as the Internet 110. In this instance, communications between the first mobile computing device 136 and other parties could be entirely carried by data communications which pass from the first mobile computing device 136 directly to a data network 110. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system located in the U.S., and that customer could then use an IP telephone 108 located in a country outside the U.S. to access the services. Likewise, the customer could also utilize a computer outside the U.S. that is running a soft-phone client to access the first IP telephony system 120. Further, in some instances a user could place a telephone call with the first analog telephone 132 or first cellular telephone 134 that is routed through the first PSTN 130 to the first IP telephony system 120 via the gateway 122. This would typically be accomplished by the user calling a local telephone number that is routed to the first IP telephony system 120 via the gateway 122. Once connected to the first IP telephony system 120, the user may then place an outgoing long distance call to anywhere in the world using the first IP telephony system's network. Thus, the user is able to place a long distance call using lower cost IP telephony service provided by the first IP telephony system 120, rather than a higher cost service provided by the first PSTN 130.

FIG. 1 also illustrates that a second IP telephony system 170 may interact with the first IP telephony system 120 via the Internet 110. For example, customers of the second IP telephony system 170 may place calls to customers of the first IP telephony system 120. In that instance, assets of the second IP telephony system 170 interact with assets of the first IP telephony system 120 to setup and carry the telephone call. Conversely, customers of the first IP telephony system 120 can place calls to customers of the second IP telephony system 170. The second IP telephony system could also interact with the other communications systems via a gateway 172.

As illustrated in FIG. 1, the second PSTN 140 may be connected to a second analog telephone 174, a second cellular telephone 176 and a second mobile computing device 178.

Figure 2:
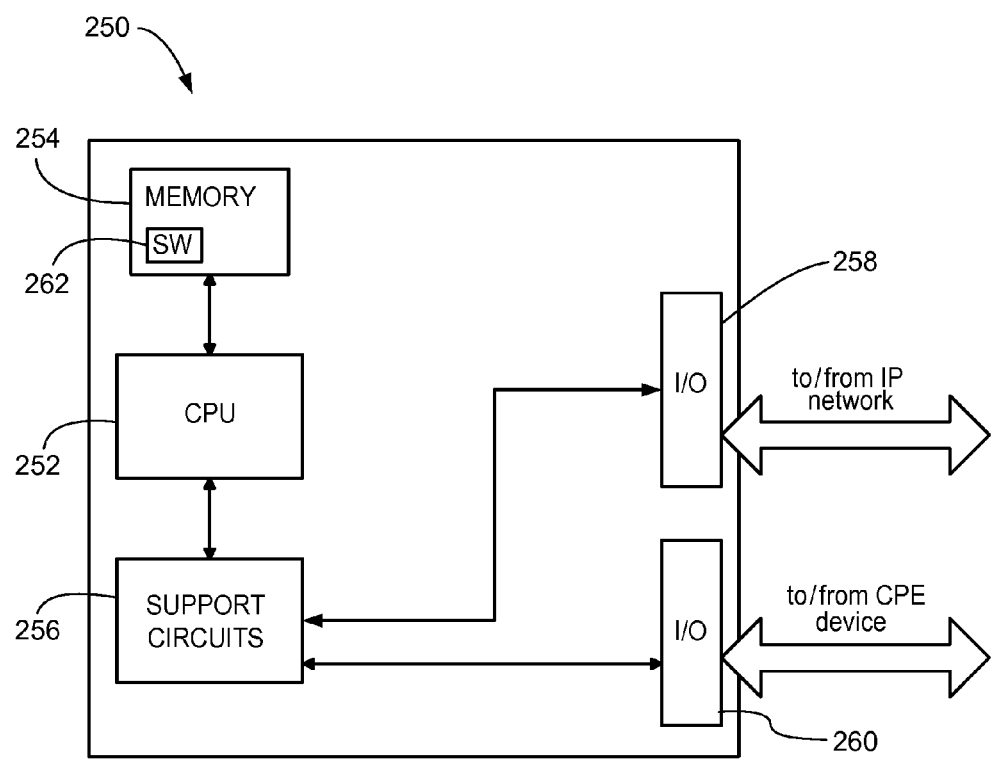
FIG. 2 is a diagram of various elements of a processor that forms part of an IP telephony system in accordance with one embodiment of the invention.

FIG. 2 illustrates elements of a computer processor 250 that can be used as part of the first or second IP telephony systems 120, 170, or as part of an IP telephony device, to accomplish various functions. Each of the IP telephony systems 120, 170, or an IP telephony device, could include multiple processors 250, along with their operating components and programming, each carrying out a specific or dedicated function.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of an IP telephony system 120/170 or an IP telephony device. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a terminal adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod Touch™ can interact with an IP telephony system to conduct a telephone call.

The following description will also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
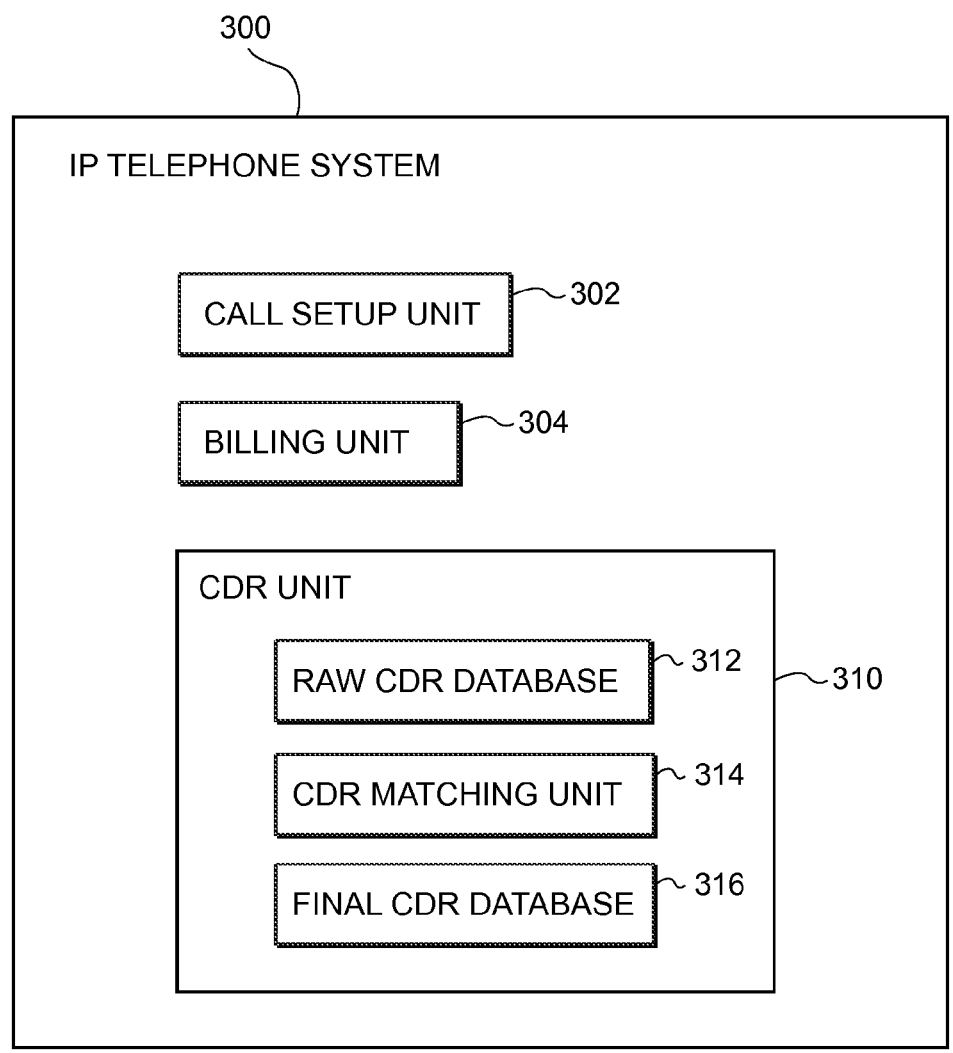
FIG. 3 is a block diagram illustrating selected elements of an IP telephony system in accordance with one embodiment of the invention.

FIG. 3 illustrates selected elements of an IP telephony system 300 in accordance with one embodiment of the invention, although the IP telephony system 300 would include additional elements. The IP telephony system 300 includes a call set up unit 302, a billing unit 304, and CDR unit 310. The CDR unit 310 includes a raw CDR database 312, a CDR matching unit 314, and a final CDR database 316. The way in which these elements of the IP telephony system 300 operate to match CDRs relating to the same telephony communication are discussed in detail below.

As mentioned above, when an incoming telephony communication is received by the IP telephony system 300, the incoming communication can be routed through multiple elements of the IP telephony system 300. Several of those elements could generate one or more CDRs for the communication, and each of these CDRs would be forwarded to CDR unit 310 for storage in the raw CDR database 312. Thus, the raw CDR database 312, stores multiple CDRs which relate to the same telephony communication.

The CDR matching unit 314 is responsible for matching the multiple CDRs in the raw CDR database 312 that relate to the same telephony communication. In some embodiments, the CDR matching unit 314 then assigns a single global identification number for the communication, and the global identification number is recorded in each of the individual CDRs that have been generated for the communication.

In some instances, the global identification number may be an identification number that was originally assigned by one of the elements responsible for handling the communication. In other embodiments, the global identification number is generated by the CDR matching unit 314, and then recorded in each of the individual CDRs for the communication.

Once multiple CDRs relating for the same communication have been identified, the CDR 310 unit may generate and store one or multiple final CDRs for the communication in the final CDR database 316. If multiple final CDRs are generated, they may be linked by a common global call ID number appearing in all of the final CDRs relating to the same communication. The final CDRs could be used by the billing unit 304 to bill a customer or another communication system for handling the communication. Alternatively, information in the final CDR database 316 could be used for other purposes, such as determining the overall path that a communication took as it traversed the elements of an IP telephony system 300. Such information could be useful in troubleshooting, quality monitoring, service assurance, and for other reasons.

Figure 4:
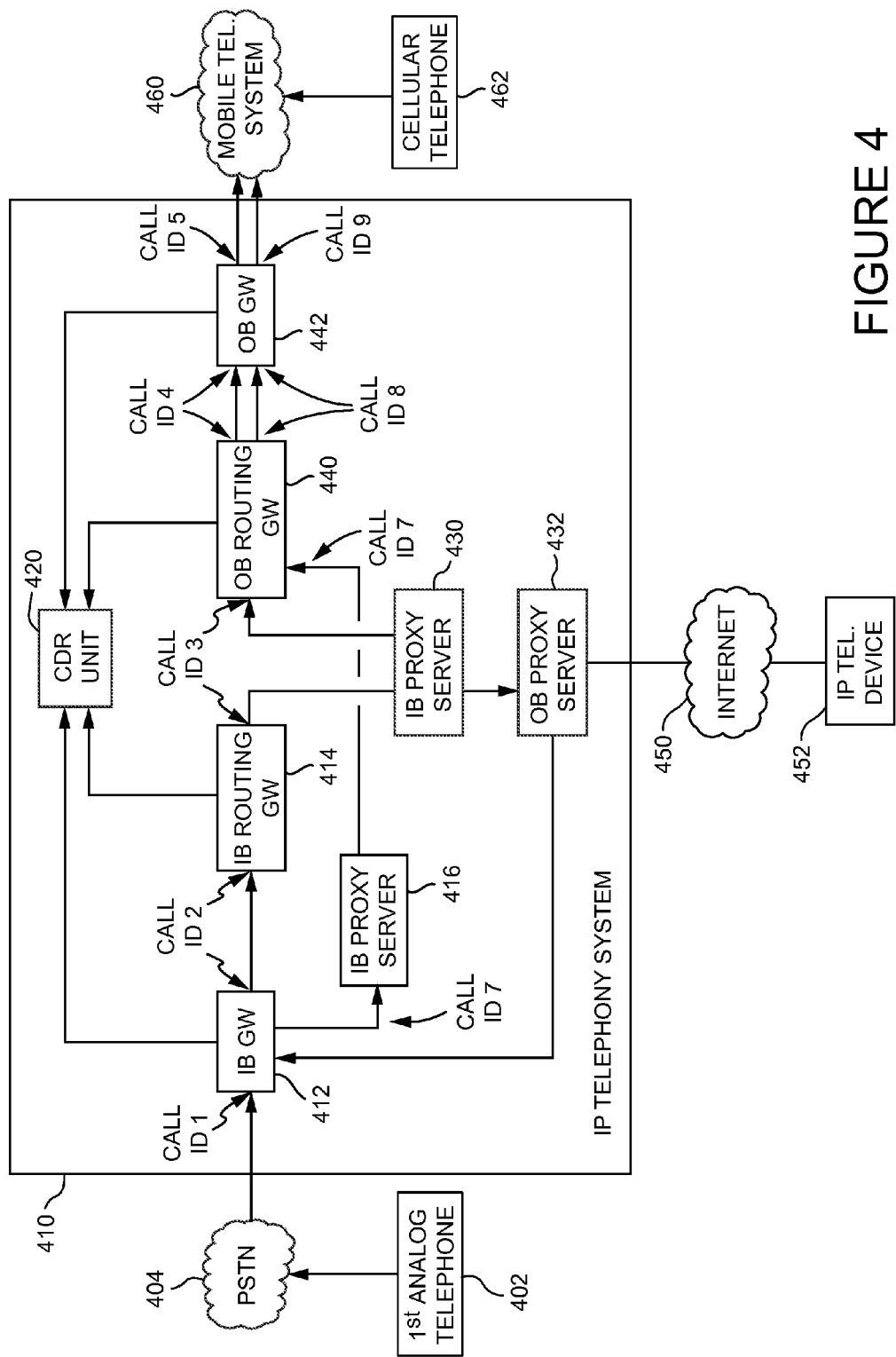
FIG. 4 is a diagram illustrating the call flow paths which can be traversed by a communication through elements of an IP telephony system in accordance with one embodiment of the invention.

FIG. 4 illustrates various call flow paths which can be traversed by different types of telephony communications. FIG. 4 will be used to explain some typical call flow paths, and how the CDRs generated by elements of the IP telephony system which handle those call flows can be matched to one another. FIG. 4 is also used to show how at least one call flow will result in the generation of CDRs which are difficult to match to one another.

In a simple inbound termination call flow, a call originates at a first analog telephone 402, and the call is directed to the IP telephony device 452. A customer of the IP telephony system 410 would use the IP telephony device 452. As reflected in FIG. 4, because the first analog telephone 402 receives its telephony service from a publically switched telephone network (PSTN) 404, the call is initially routed to the PSTN 404, and the PSTN 404 forwards the call to an inbound gateway 412 of the IP telephony system 410. At this point, the call would have a first call ID number. The inbound gateway 412 forwards the call on to an inbound routing gateway 414. Before doing so, however, the inbound gateway 412 assigns a second call ID number to the call, and this second call ID number is reflected in the messaging received by the inbound routing gateway 414. From the perspective of the inbound gateway 412, the first call ID number is an ingress call ID number, and the second call ID number is an egress call ID number. The CDR that is generated by the inbound gateway 412 will include the first and second call ID numbers in data fields labeled the ingress call ID and egress call ID, respectively.

The inbound routing gateway 414 then assigns a third call ID number to the call, and forwards the call to an inbound proxy server 430. The inbound proxy server 430 determines the identity of an outbound proxy server 432 capable of communicating with the customer's IP telephony device 452, and forwards the communication to the outbound proxy server 432. The outbound proxy server 432 then terminates the call to the customer's IP telephony device 452 via the Internet 450.

When the IP telephony system 410 operates as described above, the inbound gateway 412 and the inbound routing gateway 414 each generate a CDR for the communication, and the CDRs are forwarded to the CDR unit 420. This CDR unit 420 could be as illustrated in FIG. 3, and include a raw CDR database which stores each of the CDRs generated for the communication.

Both of the CDRs would include an ingress call ID number and an egress call ID number. For example, the CDR generated by the inbound gateway 412 would list the first call ID number originally assigned by the PSTN 404 as the ingress call ID number, and the second call ID number assigned by the inbound gateway 412 would be listed as the egress call ID number. Likewise, the CDR generated by the inbound routing gateway 414 would list the second call ID number as the ingress call ID number, and the third call ID number assigned by the inbound routing gateway 414 would be listed as the egress call ID.

The second call ID number would appear as both the egress call ID number of the first CDR and the ingress call ID number of the second CDR. Thus, a CDR matching unit of the CDR unit 420 can match the first CDR to the second CDR using the call ID number information recorded in the first and second CDRs.

FIG. 4 also illustrates that a considerably more complex call flow can result in the generation of additional CDRs by other elements. For example, assume that the user of the first IP telephony device 452 has instructed the IP telephony system 410 to forward any incoming calls directed to the IP telephony device 452 to an alternate cellular telephone 462, which receives its service from a mobile telephony system 460. As a result, a call originating from the analog telephone 402 that is initially intended for the IP telephony device 452 is ultimately forwarded to the mobile telephony system 460 for termination to the cellular telephone 462.

In this call flow, the first analog telephone 402 generates an outgoing communication which is directed to the IP telephony device 452. Because the first analog telephone 402 receives its telephony service from the PSTN 404, the call is initially routed to the PSTN 404, and the PSTN 404 forwards the call to the inbound gateway 412 of the IP telephony system 410. At this point, the call has a first call ID number. The inbound gateway 412 forwards the call on to the inbound routing gateway 414. Before doing so, the inbound gateway 412 assigns a second call ID number to the call, and this second call ID number is reflected in the messaging received by the inbound routing gateway 414. The inbound routing gateway 414 then assigns a third call ID number to the call, and forwards the call to the inbound proxy server 430.

The inbound proxy server 430, however, knows that the call should be forwarded to the cellular telephone 462. As a result, the inbound proxy server 430 sends the call to an outbound routing gateway 440 with instructions to route the call the cellular telephone 462. The signaling sent from the inbound proxy server 430 to the outbound routing gateway 440 includes the third call ID number that was originally assigned by the inbound routing gateway 414. The outbound routing gateway 440 then assigns a fourth call ID number to the communication and forwards the call on to the outbound gateway 442. The outbound gateway 442 assigns a fifth call ID number to the call, and forwards the communication on to the mobile telephony system 460 for termination to the cellular telephone 462.

When the IP telephony system 410 operates as described above, the inbound gateway 412, the inbound routing gateway 414, the outbound routing gateway 440 and the outbound gateway 442 each generate a CDR for the communication, and the CDRs are forwarded to the CDR unit 420. Each of the CDRs would include an ingress call ID number and an egress call ID number. For example, the CDR generated by the inbound gateway 412 would list the first call ID number originally assigned by the PSTN 404 as the ingress call ID number, and the second call ID number assigned by the inbound gateway 412 would be listed as the egress call ID number. Likewise, the CDR generated by the inbound routing gateway 414 would list the second call ID number as the ingress call ID number, and the third call ID number assigned by the inbound routing gateway 414 would be listed as the egress call ID.

The second call ID number would appear as both the egress call ID number of the first CDR and the ingress call ID number of the second CDR. Thus, a CDR matching unit of the CDR unit 420 can match the first CDR to the second CDR using the call ID number information recorded in the first and second CDRs. In a similar manner, the second CDR generated by the inbound routing gateway 414 can be linked to the third CDR generated by the outbound routing gateway 440 by the third call ID number. Further, the third CDR can then be matched to the fourth CDR generated by the outbound gateway 472 by the fourth call ID number. This process makes it possible to identify all of the CDRs which were issued by various elements for the same communication.

There are, however, some call flows which result in the generation of multiple CDRs which cannot be matched using the call ID numbers in the ingress call ID and egress call ID fields of the CDRs. One example is a call transfer call flow.

In a call transfer call flow, the first analog telephone 402 generates an outgoing communication which is directed to the IP telephony device 452. The call is initially routed to the PSTN 404, and the PSTN 404 forwards the call to the inbound gateway 412 of the IP telephony system 410. At this point, the call has a first call ID number. The inbound gateway 412 forwards the call on to the inbound routing gateway 414. Before doing so, the inbound gateway 412 assigns a second call ID number to the call, and this second call ID number is reflected in the messaging received by the inbound routing gateway 414. The inbound routing gateway 414 then assigns a third call ID number to the call, and forwards the call to the inbound proxy server 430. The inbound proxy server 430 then forwards the call to the outbound proxy server 432 for termination to the IP telephony device 452.

In some instances, the outbound proxy server terminates the call to the IP telephony device 452 via the Internet, and the call begins. However, the user of the IP telephony device 452 then decides to transfer the call to another telephony device, such as the cellular telephone 462. In other instances, the outbound proxy server 432 may know that the call should be immediately transferred to the cellular telephone 462, and the IP telephony device 452 may not even be involved in the call flow.

Regardless, the outbound proxy server 432 then sends a refer message to the inbound gateway 412 that originally received the incoming call. The refer message indicates that the call is to be transferred to the cellular telephone 462. The refer message received by the inbound gateway 412 will include a calling party identifier, a called party identifier, and an identifier for the telephony device to which the call is to be transferred. These identifiers are typically telephone numbers. Thus, the refer message will include the telephone number of the analog telephone 402 as the calling party identifier, the telephone number of the IP telephony device 452 as the called party identifier and the telephone number of the cellular telephone 462 as the "transfer to" identifier.

When the inbound gateway 412 receives the refer message from the outbound proxy server 432, the inbound gateway 412 generates two CDRs. It generates a "stop" CDR for the original inbound call leg that extended to the IP telephony device 452. It also generates a "start" CDR for a new outbound call leg that will extend to the cellular telephone 462. Details of those CDRs will be discussed below.

The inbound gateway 412 assigns a seventh call ID number to the call and sends the call flow to a new inbound proxy server 416. The new inbound proxy server 416 sends the call on to the outbound routing gateway 440 without changing the seventh call ID. The outbound routing gateway 440 assigns an eighth call ID number to the call and passes it on to the outbound gateway 442. The outbound gateway 442 assigns a ninth call ID number and passes the call on to the mobile telephony system 460 for termination to the cellular telephone 462.

Although the call processing described above makes it possible for the call to be transferred from the IP telephony device 452 to the cellular telephone 462, it is difficult to match up all the CDRs that relate to the communication. The refer message that is sent from the outbound proxy server 432 to the inbound gateway 412 does not include a call identification number. As a result, when the inbound gateway generates a CDR for passing the call along the outbound leg that extends to the cellular telephone 462, the CDR lacks a call ID number in the ingress call ID field. This basically breaks the chain of call ID numbers that is otherwise used to match up all the CDRs that relate to the same communication.

More specifically, it is possible to match up the first CDR generated by the inbound gateway 412 and the second CDR generated by the inbound routing gateway 414 because the second call ID number appears in the egress call ID field of the first CDR and the ingress call ID field of the second CDR.

It is also possible to match up a CDR generated by the inbound gateway 412 when it transfers the call to the inbound proxy server 416 and the CDR generated by the outbound routing gateway 440 because the seventh call ID number appears in both CDRs. These two CDRs can also be matched to the CDR generated by the outbound gateway 442 because the eighth call ID number appears in both the CDR generated by the outbound routing gateway 440 and the CDR generated by the outbound gateway 442.

However, there is no clear link between these two legs of the call flow, because the refer message sent from the outbound proxy server 432 to the inbound gateway 412 lacks a call ID number. It is, however, possible to match up the CDRs using different pieces of information in the CDRs.

As mentioned above, when the inbound gateway 412 receives the refer message from the outbound proxy server 432, it generates a first "stop" CDR for the first leg of the call, and it generates a second "start" CDR for the new outbound leg of the call that extends to the cellular telephone 462. Those two CDRs will both include the same calling party identifier and called party identifier. In addition, because the CDRs are generated at essentially the same time by the same element of the IP telephony system—the inbound gateway 412—certain timing information in the CDRs will also be identical, or very nearly identical.

In some embodiments, the timing information could be a "time-to-transfer" value, which is indicative of the time that elapsed between the point in time when the first call leg began and the point in time when the first call leg ended and the "stop" CDR was generated. This time-to-transfer value will appear in both the "stop" CDR and the new "start" CDR generated by the inbound gateway 412. More specifically, the time-to-transfer value may be an integer number which basically represents the current state of a counter that is maintained by the gateway. The "stop" CDR generated by the inbound gateway 412 will have exactly the same or very nearly the same counter number as the "start" CDR generated by the inbound gateway 412 for the outbound leg of the call that extends to the cellular telephone 462.

The timing number (which could be the time-to-transfer value or some other timing value) can be used, possibly in conjunction with the calling party identifier and the called party identifier, to match up the two CDRs. And when those two CDRs are matched, they provide a link between the two call legs, and all CDRs generated for the communication can be linked together.

In some instances, other information could also be used to facilitate the matching of CDRs. For example, a timestamp value in the CDRs could also be used. The timestamp values, in conjunction with the timing value, could be used to uniquely identity the CDRs with respect to all other CDRs that are generated by the elements of the IP telephony system. Thus, adding the timestamp information to the other information may provide a powerful tool to match CDRs for the same communication.

In one embodiment, a first transfer identification number is generated using information contained in the first "stop" CDR that is generated by the inbound gateway 412 for the first leg of the call flow. The first transfer identification number can be based on the calling party identifier, the called party identifier and the counter number in the first "stop" CDR. The first transfer identification number could be created by simply chaining the digits of those three values together in a particular order. Alternatively, the calling party identifier, the called party identifier and the counter number could be combined according to any mathematical formula or transformation to generate a transfer identification number.

Next a second transfer identification number is created using the calling party identifier, the called party identifier and the counter number in the second CDR generated for the outbound leg of the transfer call flow. The calling party identifier and the called party identifier will be identical, and the counter number will be identical, or very nearly identical. As a result, the second transfer identification number will be identical to the first transfer identification number, or nearly identical. For these reasons, if a first transfer identification number generated from a first CDR is the same, or nearly the same, as a second transfer identification number generated from a second CDR, we know that the two CDRs relate to the same transfer call flow, and the two CDRs can be used to link the two legs of the transfer call flow.

In reality, the CDRs generated by the elements of the IP telephony systems are constantly flooding in as each of the elements of the IP telephony system act to handle various call flows. Those CDRs are initially held in the raw CDR database 312. The CDR matching unit 314 must then try to match up the CDRs belonging to the same communication. Because of the way the system operates, and because of the volume of CDRs involved, it is no simple matter to match up CDRs relating to the same communication, even using the transfer ID number method outlined above.

The inventors envision a process where the CDR matching unit 314 first uses the call ID number matching methods described above to match CDRs relating to the same inbound termination call flows, forwarding call flows and other call flows which generate CDRs capable of being matched from only the information contained in the ingress call ID and egress call ID fields. Once those CDRs have been matched, there will still be a group of unmatched CDRs relating to call transfer call flows and other call flows that result in the generation of CDRs that cannot be matched using only the information in the ingress call ID and egress call ID fields. The transfer call ID technique described above would then be used to match up those remaining CDRs.

Figure 5:
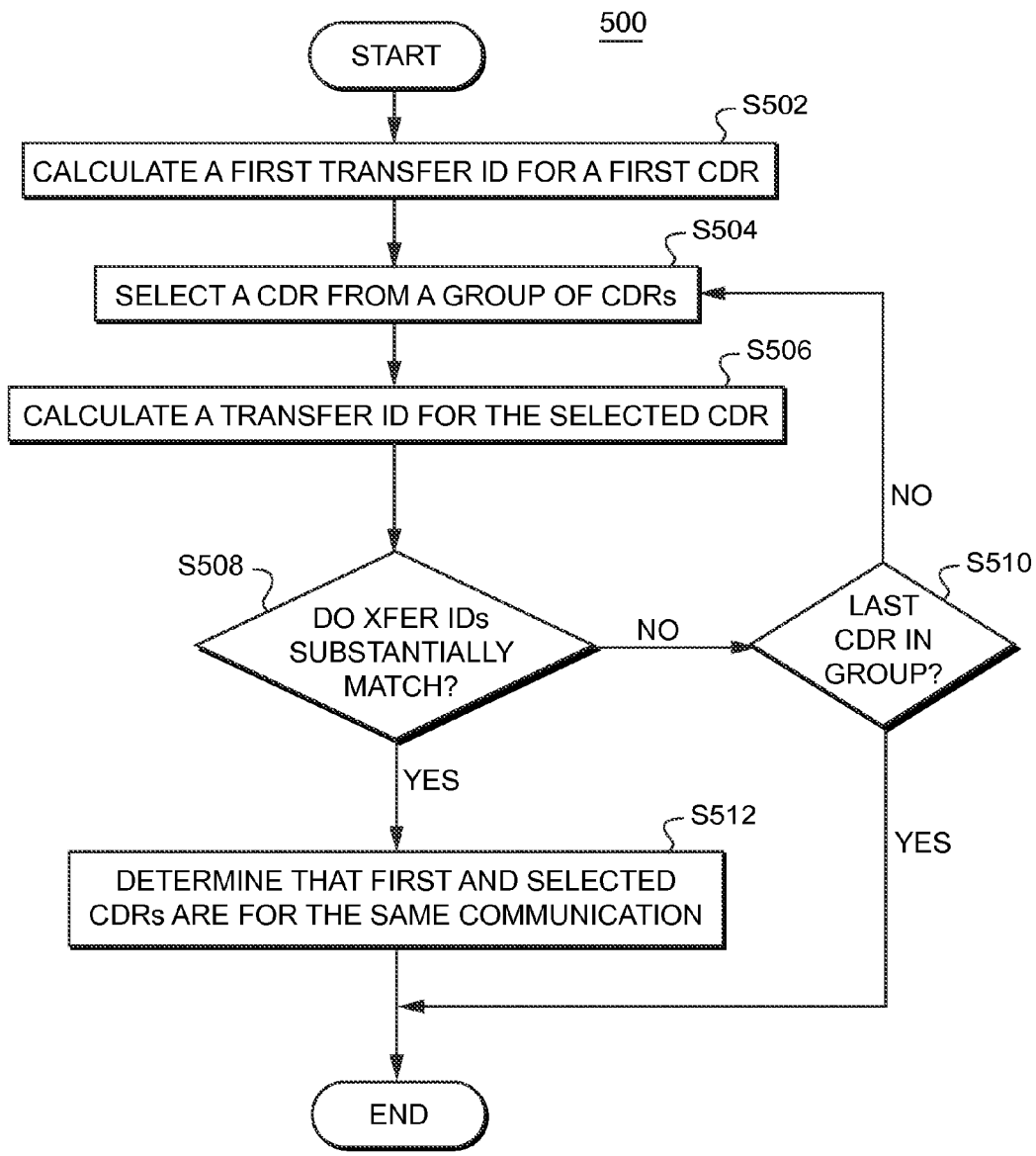
FIG. 5 is a flow diagram illustrating steps of a method of matching call detail records that are for the same communication and which have been generated by different elements of an IP telephony system in accordance with one embodiment of the invention.

FIG. 5 illustrates a method that could be performed by a CDR matching unit 314 of a CDR unit 310 of an IP telephony system 300 to match CDRs using the transfer call ID technique. The method 500 begins and proceeds to step S502, where a first transfer ID number is calculated or generated using information in a first unmatched CDR. The method then proceeds to step S504 where another unmatched CDR is selected from a group of unmatched CDRs. In step S506, a transfer ID is calculated or generated for the selected CDR using information in the second CDR.

In step S508 a check is performed to determine if the first transfer ID number is the same, or nearly the same, as the second transfer ID number. If not, the method proceeds to step S510 to determine if the selected CDR was the last available CDR that was available for matching to the first CDR. If so, the method ends. If not, the method returns to step S504 and another CDR is selected from a group of unmatched CDRs. The calculation step S506 and comparison step 508 are then repeated for the newly selected CDR. Steps S504, S506, S508 and S510 repeat in a looping fashion until all unmatched CDRs have been selected and compared, or until one of the comparisons performed in step S508 indicates that the transfer ID numbers are the same or nearly the same. If this occurs, the method proceeds to step S512, and it is determined that the first and selected CDRs are from the same communication. The method then ends.

A method as described above would be repeated until all the unmatched CDRs are matched to another CDR, or until no more matching is possible.

In some embodiments, the transfer ID number is calculated based on the calling party identifier, the called party identifier and a counter number in the CDRs. However, other information could also be used to calculate or generate the transfer ID number. For example, a timestamp value and/or an hour of the day that the CDR was generated could also be used to calculate or generate the transfer call ID number. Also, in alternate embodiments, only the called party identifier or only the calling party identifier could be used. In still other embodiments, it might be possible to use an identifier associated with the "transfer to" party. Virtually any combination of information that is present in both the CDRs could be used to calculate the transfer ID number.

The counter number that is used to calculate the transfer ID number could be representative of an internal time clock of the gateway generating the CDRs, or it could be representative of the duration of the communication that gives rise to the CDRs. In alternate embodiments, the counter number could be representative of other timing information. The important point, however, is that the counter number is likely to be the same, or very nearly the same, in the two CDRs generated by the inbound gateway 412 during a call transfer call flow.

The foregoing descriptions showed how a transfer ID calculated for first and second CDRs can be used to link two legs of a call transfer call flow. However, the same basic procedures could be used to link one or more legs of other types of call flows that result in the generation of CDRs that are otherwise difficult to connect.

When one is attempting to match a first CDR to a second CDR which relates to the same communication, one would compare the first CDR to a group of candidate CDRs which are likely to have been generated for the same telephony communication. One can utilize a time window to select a group of candidate CDRs which are to be compared to a first CDR for a telephony communication. The time window would be for a period of time that begins when the first CDR was generated and for a short period of time thereafter.

Although many of the above examples were given with respect to a call which originated from a first telephone, and which was directed to a second telephone, the matching methods described above are not limited to matching CDRs generated for telephone calls. CDRs which are generated in connection with other types of communications handled by an IP telephony system can also be matched to one another in similar ways.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of determining that two call detail records (CDRs) generated by at least one element of an IP telephony system relate to the same telephony communication, comprising:

generating a first transfer identification number using information contained in a first CDR;

generating a second transfer identification number using information contained in a second CDR; and determining that the first and second CDRs relate to the same communication if the first transfer identification number substantially matches the second transfer identification number.

2. The method of claim 1, wherein the first and second transfer identification numbers are generated based upon timing information contained in the first and second CDRs, respectively.

3. The method of claim 2, wherein the first and second transfer identification numbers are also generated based upon calling party identifiers contained in the first and second CDRs, respectively.

4. The method of claim 3, wherein the calling party identifiers are telephone numbers of the calling parties.

5. The method of claim 2, wherein the first and second transfer identification numbers are also generated based on called party identifiers in the first and second CDRs, respectively.

6. The method of claim 5, wherein the called party identifiers are telephone numbers of the called parties.

7. The method of claim 2, wherein the first transfer identification number is based on a transfer identifier contained in the first CDR, and the second transfer identification number is based upon at least one of a transfer identifier and a called party identifier in the second CDR.

8. The method of claim 2, wherein the first CDR does not include an ingress call identification number.

9. The method of claim 2, wherein the first and second transfer identification numbers are also generated based on timestamp information in the first and second CDRs, respectively.

10. The method of claim 1, further comprising selecting the second CDR from a group of CDRs that were generated within a predetermined time window.

11. The method of claim 10, wherein the predetermined time window begins at the time that the first CDR was generated.

12. A system for determining that two call detail records (CDRs) generated by at least one element of an IP telephony system relate to the same telephony communication, comprising:
  means for generating a first transfer identification number using information contained in a first CDR;
  means for generating a second transfer identification number using information contained in a second CDR; and
  means for determining that the first and second CDRs relate to the same communication if the first transfer identification number substantially matches the second transfer identification number.

13. A system for determining that two call detail records (CDRs) generated by at least one element of an IP telephony system relate to the same telephony communication, comprising a CDR matching unit that generates a first transfer identification number using information contained in a first CDR, that generates a second transfer identification number using information contained in a second CDR, and that determines the first and second CDRs relate to the same communication if the first transfer identification number substantially matches the second transfer identification number.

14. The system of claim 13, wherein the CDR matching unit generates the first and second transfer identification numbers based upon timing information contained in the first and second CDRs, respectively.

15. The system of claim 14, wherein the CDR matching unit also generates the first and second transfer identification numbers based upon calling party identifiers contained in the first and second CDRs, respectively.

16. The system of claim 15, wherein the calling party identifiers are telephone numbers of the calling parties.

17. The system of claim 14, wherein the CDR matching unit also generates the first and second transfer identification numbers based on called party identifiers in the first and second CDRs, respectively.

18. The system of claim 17, wherein the called party identifiers are telephone numbers of the called parties.

19. The system of claim 14, wherein the CDR matching unit generates the first transfer identification number based on a transfer identifier contained in the first CDR, and the CDR matching unit generates the second transfer identification number based upon at least one of a transfer identifier and a called party identifier in the second CDR.

20. The system of claim 14, wherein the first CDR does not include an ingress call identification number.

21. The system of claim 14, wherein the CDR matching unit also generates the first and second transfer identification numbers based on timestamp information in the first and second CDRs, respectively.

22. The system of claim 13, wherein the CDR matching unit selects the second CDR from a group of CDRs that were generated within a predetermined time window.

23. The system of claim 22, wherein the predetermined time window begins at the time that the first CDR was generated.

* * * * *